E. B. MOSELEY, DEC'D.
M. L. MOSELEY, ADMINISTRATRIX.
FILING APPLIANCE CASE.
APPLICATION FILED OCT. 11, 1918.
1,393,690.
Patented Oct. 11, 1921.
5 SHEETS—SHEET 5.
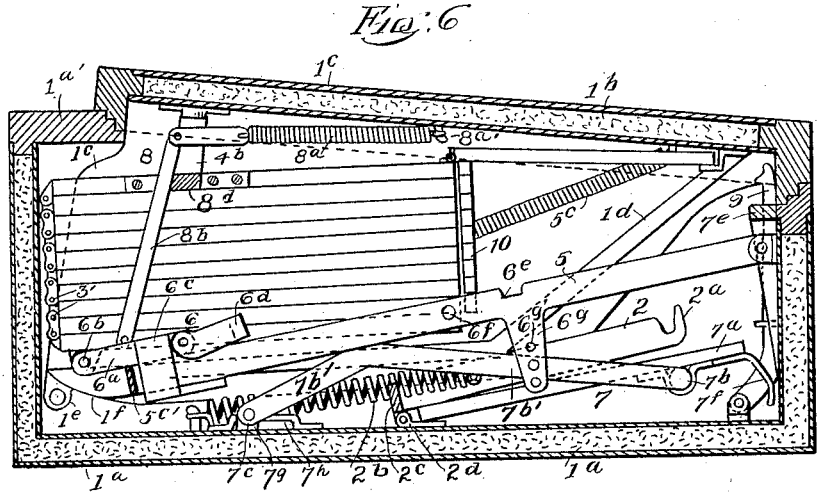
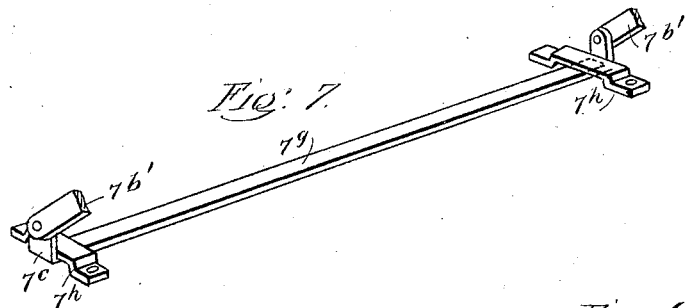
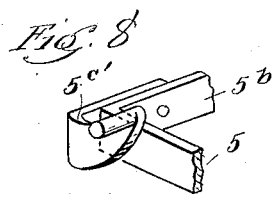
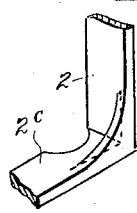
INVENTOR,
Emerson B. Moseley,
Metta L. Moseley, administratrix,

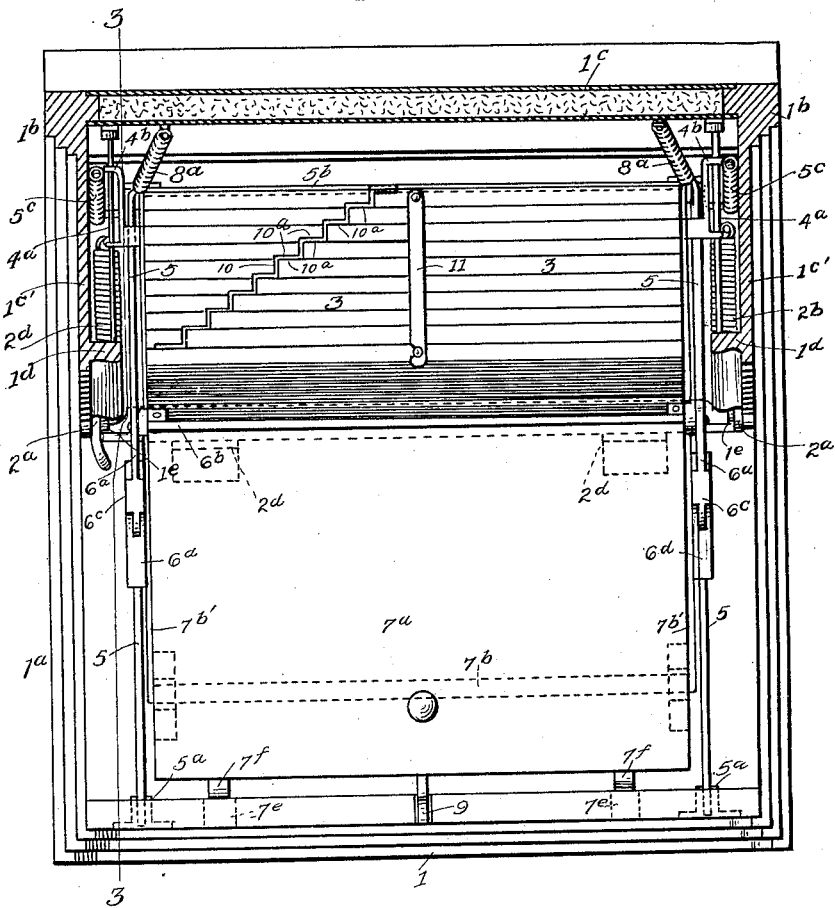

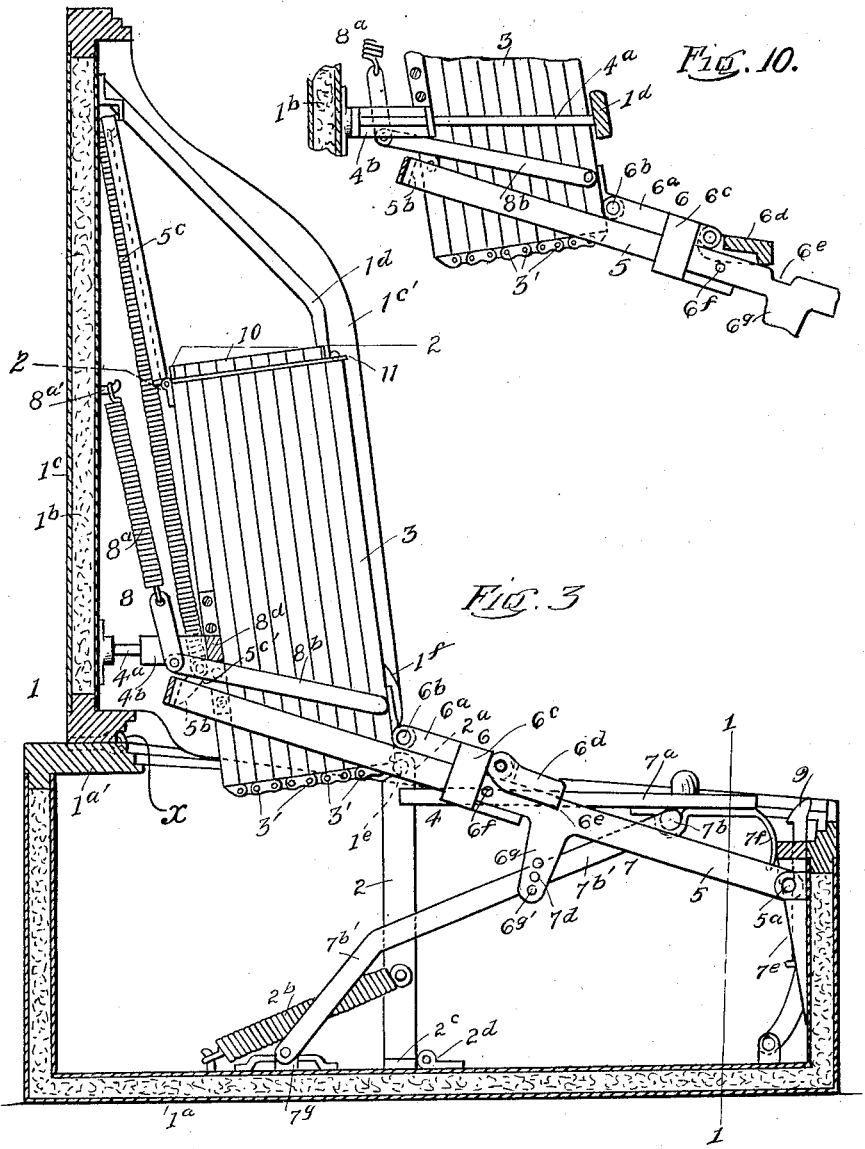

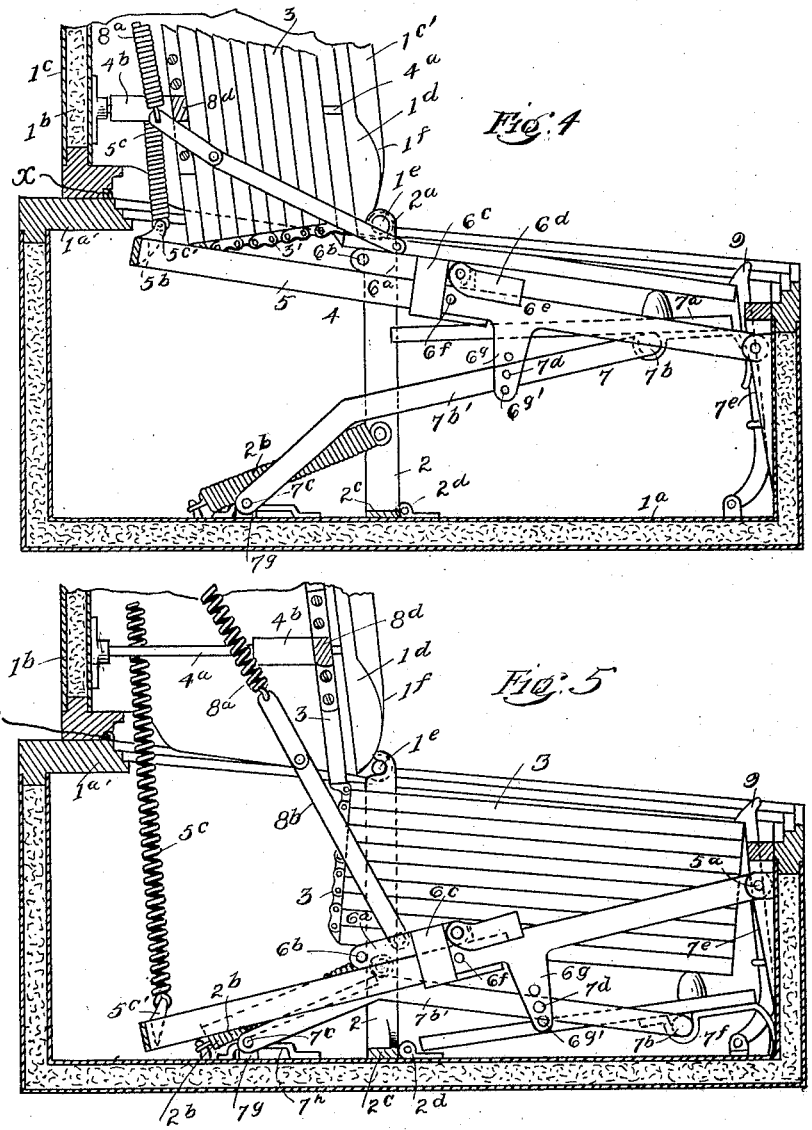

UNITED STATES PATENT OFFICE.

EMERSON B. MOSELEY, DECEASED, LATE OF ALLIANCE, OHIO, BY METTA L. MOSELEY, ADMINISTRATRIX, OF ALLIANCE, OHIO, ASSIGNOR TO THE McCASKEY REGISTER COMPANY (INCORPORATED IN 1914), OF ALLIANCE, OHIO, A CORPORATION OF OHIO.

FILING-APPLIANCE CASE.

1,393,690.     Specification of Letters Patent.     Patented Oct. 11, 1921.

Orignial application filed May 26, 1915, Serial No. 30,672. Divided and this application filed October 11, 1918. Serial No. 257,783.

*To all whom it may concern:*

Be it known that EMERSON B. MOSELEY, deceased, late a citizen of the United States, residing at Alliance, in the county of Stark and State of Ohio, was the inventor of certain new and useful Improvements in Filing-Appliance Cases, for which I, METTA L. MOSELEY, as the administratrix of his estate, make application for Letters Patent of the United States, this application being divided from the certain application filed by said EMERSON B. MOSELEY on May 26, 1915, Serial No. 30,672, for filing appliances, of which present invention and improvements the following is a specification.

This invention relates to filing appliances, particularly of the pivoted frame type, wherein slips of paper can be filed in classified order, inspected and removed in a rapid and efficient manner and safely stored.

One object of the invention is to provide in appliances of this character an improved casing having a movable member, the casing being adapted to inclose the frames and other parts of the appliance and the movable member operating to permit access to the frames for inspection and manipulation.

Another object of the invention is to provide in appliances of this character improved means for supporting and controlling the easy and rapid operation of the frames.

Another object of the invention is to provide in appliances of this character improved means for so supporting and controlling the operation of the frames that the frame or frames which are exposed at any time are always positioned at a predetermined distance from the eyes of the operator.

With these and other objects in view, the invention consists of the parts and combination or combinations of parts hereinafter described and set forth in the appended claims.

For the purpose of illustration I have, in the accompanying drawings, shown and herein described one form of apparatus embodying my invention.

Referring to the drawings, Figure 1 is a view, partly in elevation and partly in section (which sectional part is taken on the line 1—1 of Fig. 3) of a filing appliance and casing therefor embodying my invention.

Fig. 2 is a section on the line 2—2 of Fig. 3.

Fig. 3 is a side elevation of the filing appliance, with the near side of the casing removed.

Fig. 4 is a fragmentary view similar to Fig. 3, but showing the position of the frames when the front one thereof is operated.

Fig. 5 is a view similar to Fig. 4, showing the position of the parts when all the frames, except the last one thereof, are operated.

Fig. 6 is a view of the filing appliance, showing the position of the leaves and other parts of the interior mechanism when the casing is closed.

Figs. 7, 8 and 9 are detail views.

Fig. 10 is a fragmentary view of the leaves and adjacent parts, the leaves being shown in the position they occupy when bodily moved rearwardly in the cabinet.

Figure 1:
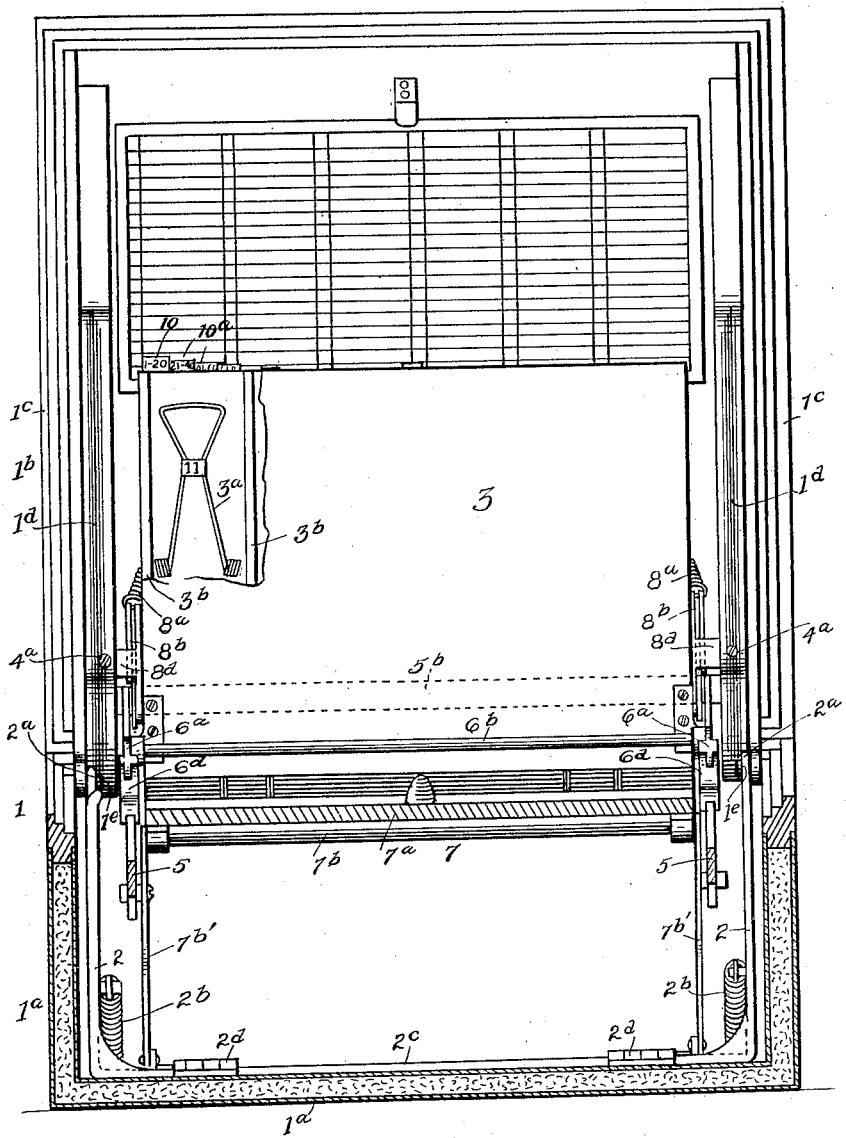

In the drawings, 1 indicates as an entirety a casing comprising a lower member $1^a$, which is preferably stationary, and an upper member $1^b$ pivoted on and swingable relative to the lower member $1^a$. The upper or movable member $1^b$ is adapted to fit upon the lower member $1^a$, as shown in Fig. 6 and when so positioned forms a substantially closed casing. From this position, the casing member $1^b$ is swingable to an upright position, as shown in Fig. 3.

The meeting edges between the casing members are preferably of the stepped or interlocking type to prevent easy access to the casing.

The casing members $1^a$, $1^b$, are of suitable size and shape to house the slip holding frames and other parts of the apparatus.

As shown in the drawings, the casing members $1^a$, $1^b$, are constructed of fire resisting structural elements and materials in any preferred manner, so as to make the casing 1 substantially fire proof. This construction permits the paper receiving and supporting frames to be inclosed within the casing and stored during closing hours of the business or office in which the appliance is used, without danger from fire, or at least any greater danger than would be incident to storage of the frames in a safe or vault. In this connection the casing 1 is adapted to be suitably locked and otherwise constructed to prevent opening by unauthorized persons.

The movable member $1^b$ is preferably hinged at $x$ along its lower edge in any suitable manner to the rear wall of the member $1^a$, or a cross member $1^{a'}$ connected thereto. The movable member $1^b$ preferably comprises a back or top $1^c$ and side members $1^{c'}$, which are rigidly secured together in a well known manner. The side members $1^{c'}$ are secured to the top at a point slightly remote from its opposite edges so that when the movable member $1^b$ is closed, the side members $1^{c'}$ move to and occupy a position side by side with the side walls of the member $1^a$. $1^d$ indicates guides, one carried by each of the side members $1^{c'}$, for a purpose to be later described.

2 indicates a pair of swingable members having hook-shaped free ends $2^a$, each of which is adapted to be connected to a pin $1^e$ fixed to the outer lower edge of the adjacent side member $1^{c'}$. The members 2 are mounted on the casing member $1^a$ and serve to support the front ends of the side members $1^{c'}$, and through them to maintain the movable member $1^b$ in upright position, as shown in Fig. 3, and incapable of either forward or rearward movement. The hooks $2^a$ and pins $1^e$ serve as detachable connections between the members 2 and sides $1^{c'}$. $2^b$ indicates one or more springs interposed between and connected at their opposite ends to the member $1^a$ and members 2, and tending to swing the members 2 rearwardly into engagement with the pins $1^e$.

The guides $1^d$ serve to control and guide the supporting members 2, so that when the movable member $1^b$ is elevated the members 2 will automatically engage the pins $1^e$ just as the casing member $1^b$ reaches the upright position. Each guide $1^d$ is disposed in the vertical plane of the adjacent member 2 and extends down to a point close to the adjacent pin $1^e$. During the opening and closing of the casing, the free ends of the member 2 will ride on said guide, being maintained in engagement therewith by the springs $2^b$. Assuming that the casing 1 is open and it is desired to close it, it is first necessary to swing the members 2 forwardly slightly to disengage them from their pins $1^e$; thereupon the top movable member $1^b$ can be swung downwardly on top of the stationary casing member $1^a$. During this operation the members 2 will ride upwardly on the guides $1^d$ and be forced forwardly thereby in opposition to the tension of the springs $2^b$; when the movable member $1^b$ is opened or swung upwardly, the members 2 will ride on the guides in the opposite direction and be guided into engagement with the pins $1^e$, which operation will be effected as the movable member $1^b$ reaches the upright position. Each of the guides $1^d$ is preferably provided with a cam $1^f$ which serves to swing the adjacent member 2 slightly forward just prior to the engagement of the hook $2^a$ thereof with the pin $1^e$, so that as the member $1^b$ moves into the upright position, the members 2 will swing outwardly and then inwardly about their pivots to properly interlock with the pins $1^e$. As a result of this construction and operation, I am enabled to provide a simple, yet highly efficient, form of support between the front end of the side members $1^{c'}$ and the supporting members 2 and to provide for the automatic connection therebetween. The members 2 are preferably connected together by a transverse bar $2^c$ which has pivot connection $2^d$ with the bottom of the member $1^a$. The pivot connections $2^d$ between the bar $2^c$ and the casing member $1^a$ are preferably so arranged that the latter forms a stop to limit the rearward movement of the members 2 beyond the vertical plane thereof.

3 indicates a series of frames, each of which is adapted to removably receive and support slips of papers—such as sales slips—in classified order or otherwise. $3^a$ indicates the clips (only one being shown) preferably formed of resilient wire and secured to the inner faces of the front and rear frames and to the opposite faces of each of the remaining frames, whereby they serve to secure to the frames the slips of paper in a manner well known to those skilled in the art to which my invention relates. The frames 3 are pivoted to each other at $3'$ in any suitable manner along their lower edges. Each frame may be constructed in any preferred manner, and provided with longitudinally extending spacers $3^b$ which serve to form pockets or side walls for the slips filed behind each clip $3^a$ and spacing devices between the frames, whereby the latter can be bunched together face to face without danger of interference between the clips $3^a$ or slips on adjoining frames.

4 indicates as an entirety the devices for supporting the frames 3 and permitting them to swing singly or in groups (except the rearmost frame) from an upright position to a horizontal position, and vice versa, and to be inclosed within the casing 1 when the movable member $1^b$ thereof is folded downwardly or closed; all as fully set forth in Letters Patent No. 1,281,812, granted October 15, 1918, upon the parent application, from which this application has been divided.

I claim:—

1. In a filing appliance, the combination of a casing adapted to support and inclose a set of frames and comprising a stationary member and a movable member hinged on the stationary member, the hinge between said members being arranged between the rear edge of the movable member and the stationary member and members swingably supported by the stationary member for detachable engagement with the movable member to support it in upright position and guides on the movable member for the swingable members.

2. In a filing appliance, the combination of a casing adapted to support and inclose a set of frames and comprising a stationary member and a movable member hinged on the stationary member, the hinge between said members being arranged between the rear edge of the movable member and the stationary member, members swingably supported by the stationary member and coöperating with the pivots between the members for supporting the movable member in upright position and guides on the movable member having cams for operating said swingable members whereby they are caused to engage the movable member automatically.

3. In a filing appliance, the combination of a casing adapted to support and inclose a set of frames and comprising a stationary member and a movable member hinged on the stationary member, the hinge between said members being arranged between the rear edge of the movable member and the stationary member, and spring operated devices swingably supported by the stationary casing member for detachable engagement with the movable member to support it in upright position.

4. In a filing appliance, the combination of a casing adapted to support and inclose a set of frames and comprising a stationary member and a movable member hinged on the stationary member, the hinge between said members being arranged between the rear edge of the movable member and the stationary member, spring operating devices swingably supported by the stationary casing member for detachable engagement with the movable member to support it in upright position, and means for limiting the movement of said devices in one direction.

5. In a filing appliance, the combination of a casing adapted to support and inclose a set of frames and comprising a stationary member and a movable member having pins hinged thereon, the hinge between said members being arranged between the rear edges of said members, spring operated devices swingably supported on the stationary casing member arranged to engage said pins and coöperating with the pivots between said members for supporting the member in upright position, and means serving to actuate the members about their pivots, whereby they are caused to engage the pins on the movable member.

6. In a filing appliance, the combination of a casing adapted to support and inclose a set of frames and comprising a stationary member and a movable member hinged on the stationary member, the hinge between said members being arranged between the rear edge of the movable member and the stationary member, members swingably supported by the stationary member for detachable engagement with the movable member to support it in upright position and coöperating devices operating to swing the members in opposite directions whereby they are caused to engage the movable member.

7. In a filing appliance, the combination of a casing adapted to support and inclose a set of frames and consisting of a stationary member and a movable member, said movable member comprising a top hinged to the rear wall of the stationary member and opposite sides arranged to telescope within the stationary member, devices of the stationary member adapted to be detachably connected to the sides of the movable member to support it in upright position, and devices carried by the casing members for controlling said devices when the movable member is opened.

8. In a filing appliance, the combination of a casing comprising two hinged members one of which swings relative to the other, devices movably mounted upon the stationary member of said casing and coöperating with the hinge between said members for supporting the movable member in open position, means for moving said devices in one direction, and means for moving said devices in the opposite direction during the opening movement of said movable member but permitting said devices to move under the action of said first mentioned moving means, whereby said devices engage the movable member.

9. In a filing appliance, the combination of a casing comprising two hinged members one of which swings relative to the other, devices movably mounted upon the stationary member of said casing and coöperating with the hinge between said members for supporting the movable member in open position, springs for moving said devices in one direction, and means for moving said devices in the opposite direction during the opening movement of said movable member but permitting said devices to move under the action of said springs, whereby said devices engage the movable member.

10. In a filing appliance, the combination of a casing comprising two hinged members one of which swings relative to the other, devices movably mounted upon the stationary member of said casing and coöperating with the hinge between said members for supporting the movable member in open position, means for moving said devices in one direction, and cams for moving said devices in the opposite direction during the opening movement of said movable member but permitting said devices to move under the action of said first mentioned moving means, whereby said devices engage the movable member.

11. In a filing appliance, the combination of a casing comprising two hinged members one of which swings relative to the other, devices movably mounted upon the stationary member of said casing and coöperating with the hinge between said members for supporting the movable member in open position, springs for moving said devices in one direction, and cams for moving said devices in the opposite direction during the opening movement of said movable member but permitting said devices to move under the action of said springs, whereby said devices engage the movable member.

METTA L. MOSELEY,
*Administratrix of Emerson B. Moseley, deceased.*